US012563372B2

(12) United States Patent
Kohzu et al.

(10) Patent No.: US 12,563,372 B2
(45) Date of Patent: Feb. 24, 2026

(54) ON-VEHICLE APPARATUS AND CONTROL METHOD

(71) Applicant: Panasonic Intellectual Property Management Co., Ltd., Osaka (JP)

(72) Inventors: Fumiya Kohzu, Osaka (JP); Yusuke Saito, Osaka (JP); Tomohiro Konuma, Osaka (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 605 days.

(21) Appl. No.: 17/988,530

(22) Filed: Nov. 16, 2022

(65) Prior Publication Data

US 2023/0171572 A1      Jun. 1, 2023

(30) Foreign Application Priority Data

Nov. 29, 2021    (JP) ................................. 2021-193442

(51) Int. Cl.
   *H04W 4/40*        (2018.01)
   *H04W 60/00*       (2009.01)

(52) U.S. Cl.
   CPC ............. *H04W 4/40* (2018.02); *H04W 60/00* (2013.01)

(58) Field of Classification Search
   CPC ......... H04W 4/40; H04W 4/48; H04W 12/50; H04W 60/00; G06F 21/6209; G06F 2221/2143
   See application file for complete search history.

(56) References Cited

U.S. PATENT DOCUMENTS

| | | | | |
|---|---|---|---|---|
| 10,045,182 B2 * | 8/2018 | Ochi | ....................... | H04W 4/30 |
| 10,111,272 B1 * | 10/2018 | Withers | ................ | H04W 76/14 |
| 11,586,990 B2 * | 2/2023 | Sakurada | ............... | G06Q 10/02 |
| 2010/0285787 A1 * | 11/2010 | Matsuda | ............ | H04M 1/2757 |
| | | | | 455/418 |
| 2017/0188395 A1 * | 6/2017 | Kim | ........................ | H04W 4/40 |
| 2018/0268683 A1 * | 9/2018 | Oh | .......................... | B60K 35/10 |
| 2021/0297520 A1 * | 9/2021 | Takada | ................ | H04M 1/6091 |

FOREIGN PATENT DOCUMENTS

| | | | | | |
|---|---|---|---|---|---|
| CN | 117075686 A | * | 11/2023 | ......... | G06F 21/6245 |
| EP | 2914041 A1 | * | 9/2015 | .......... | G06F 13/102 |
| JP | 2013044708 A | * | 3/2013 | | |
| JP | 2013-193598 | | 9/2013 | | |
| JP | 6221739 | | 11/2017 | | |
| WO | WO-2019111681 A1 | * | 6/2019 | ......... | G06F 21/6245 |

OTHER PUBLICATIONS

Office Action from Japan Patent Office (JPO) in Japanese Patent Appl. No. 2021-193442, dated Oct. 3, 2023, together with an English language translation.

* cited by examiner

*Primary Examiner* — Charles N Appiah
(74) *Attorney, Agent, or Firm* — Greenblum & Bernstein, P.L.C.

(57) ABSTRACT

An on-vehicle apparatus includes: a storage that stores apparatus information related to an external apparatus, the apparatus information being stored for registering the external apparatus as a first apparatus capable of using the on-vehicle apparatus; and a controller that deletes the apparatus information stored in the storage when a use of the on-vehicle apparatus using the external apparatus registered as the first apparatus is determined to have ended.

8 Claims, 9 Drawing Sheets

[Smartphone of XX]
Do you wish to register as apparatus
to be used at all times?

Register as apparatus
to be used at all times

Register as guest

80 Controller

81 Reception unit

82 Display controller

83 First acceptance unit

84 Second acceptance unit

85 Registration controller

86 Use controller

87 Use determiner

88 Registration determiner

89 Storage controller

FIG. 3

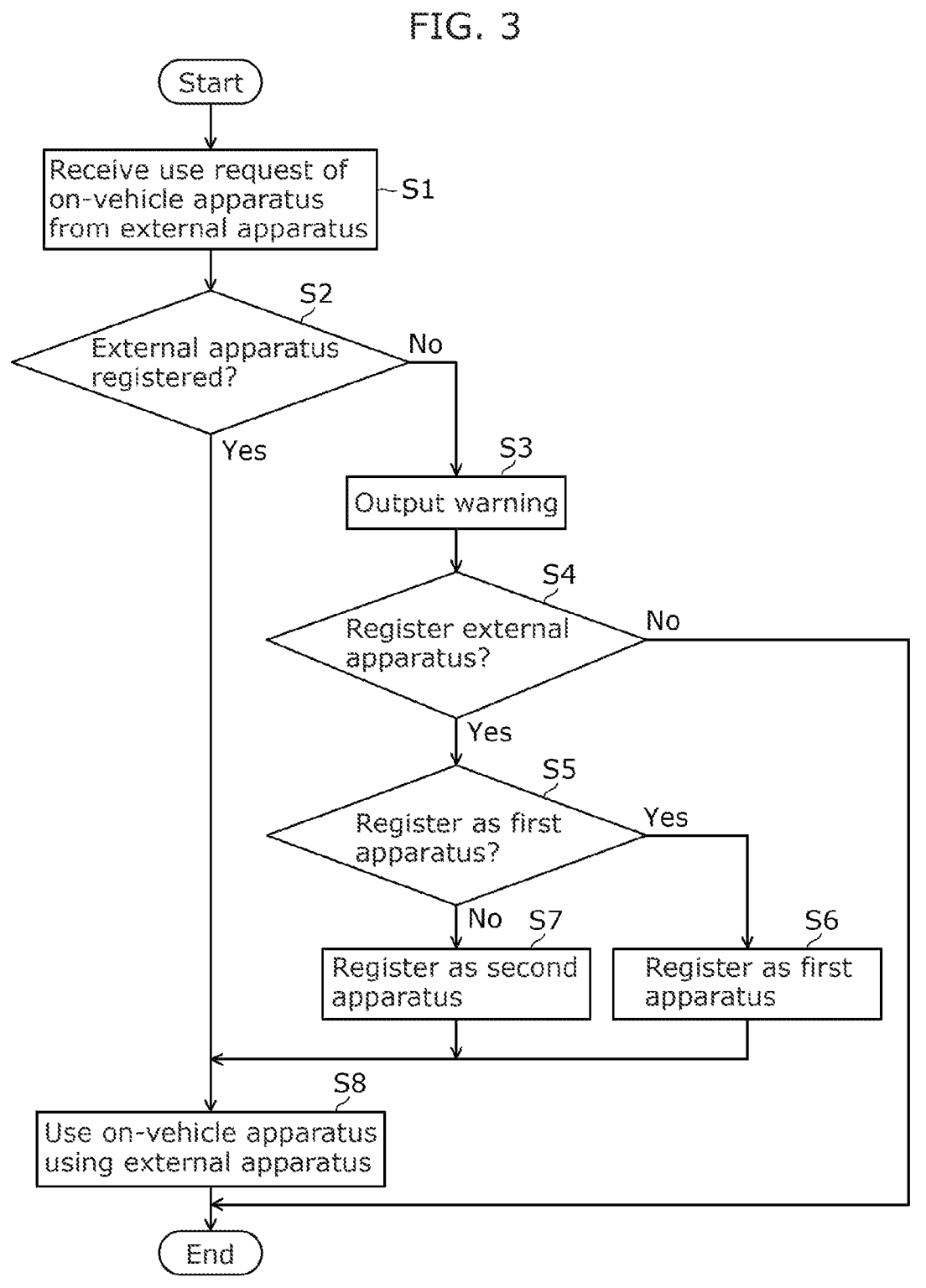

Start

Receive use request of
on-vehicle apparatus
from external apparatus    ~S1

S2
External apparatus
registered?    No

Yes

S3
Output warning

S4
Register external
apparatus?    No

Yes

S5
Register as first
apparatus?    Yes

No    S7                              S6

Register as second
apparatus                    Register as first
                             apparatus S8
Use on-vehicle apparatus
using external apparatus End

FIG. 4

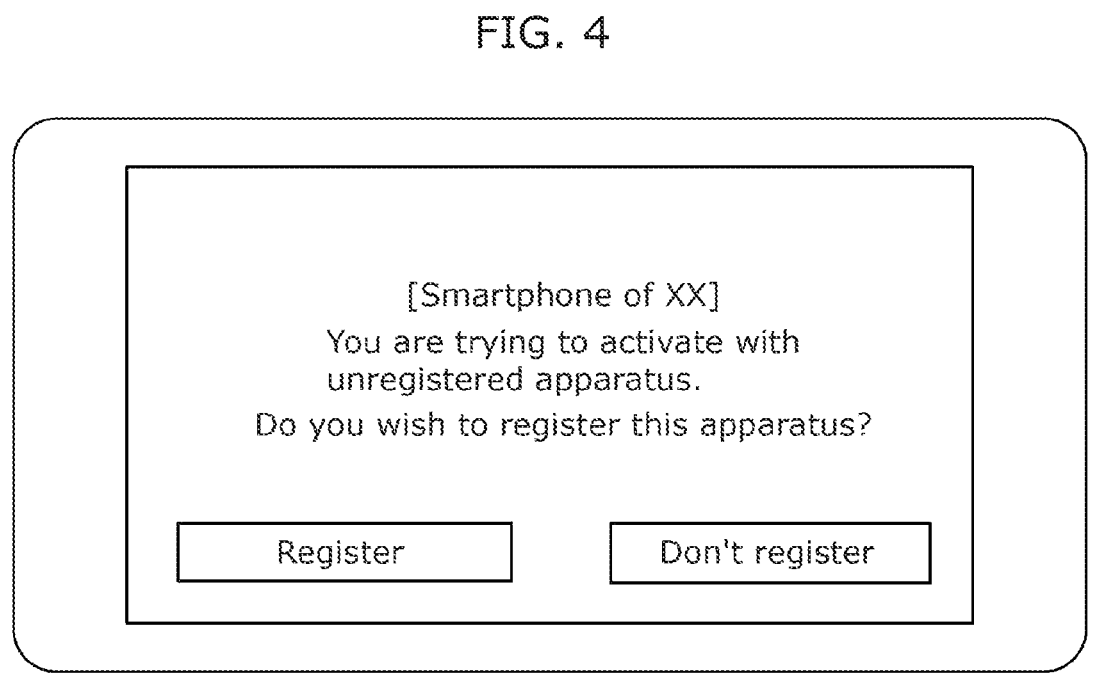

[Smartphone of XX]
You are trying to activate with
unregistered apparatus.
Do you wish to register this apparatus?

| Register | | Don't register |

FIG. 5

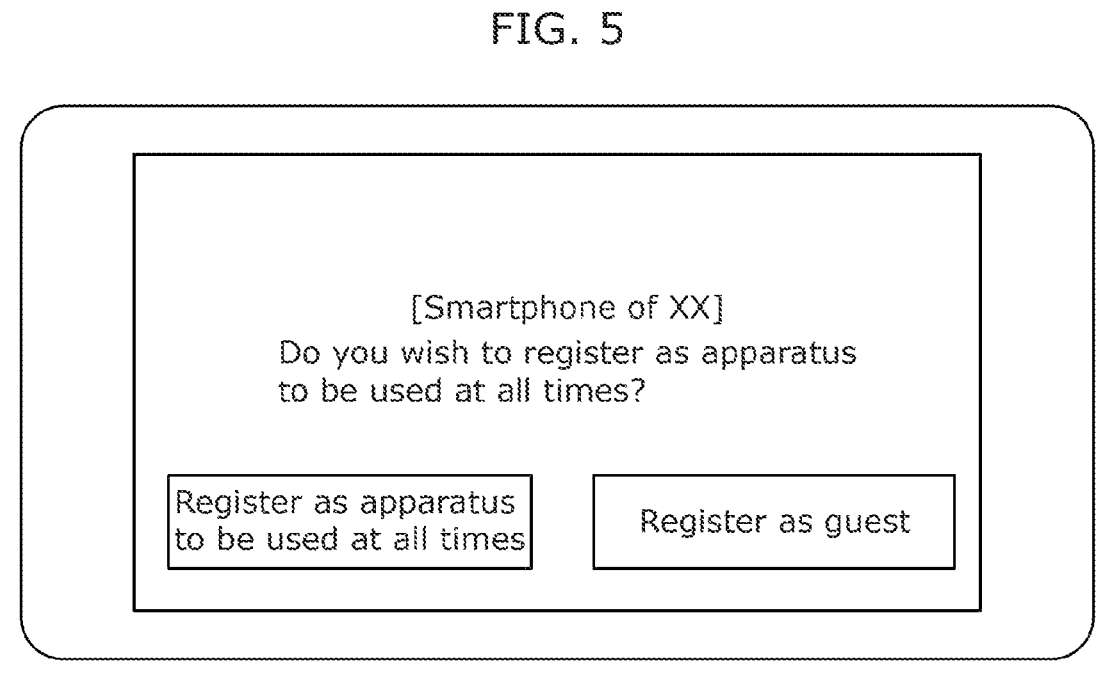

[Smartphone of XX]
Do you wish to register as apparatus
to be used at all times?

Register as apparatus
to be used at all times

Register as guest

FIG. 6

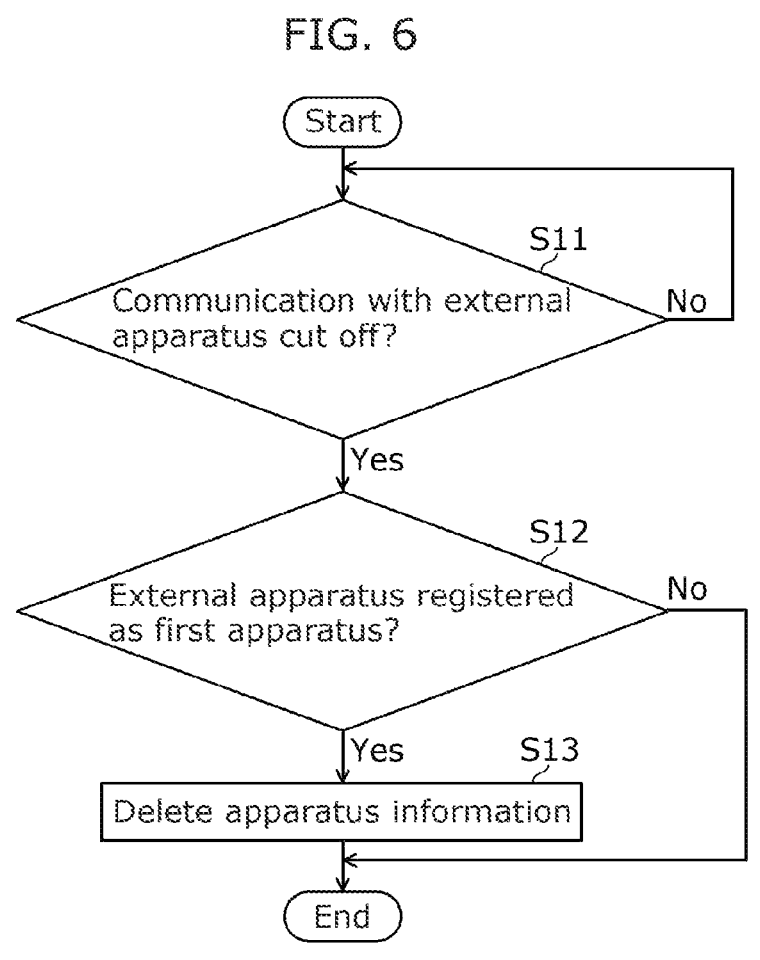

Start

S11

Communication with external apparatus cut off?

No

Yes

S12

External apparatus registered as first apparatus?

No

Yes   S13

Delete apparatus information

End

FIG. 8

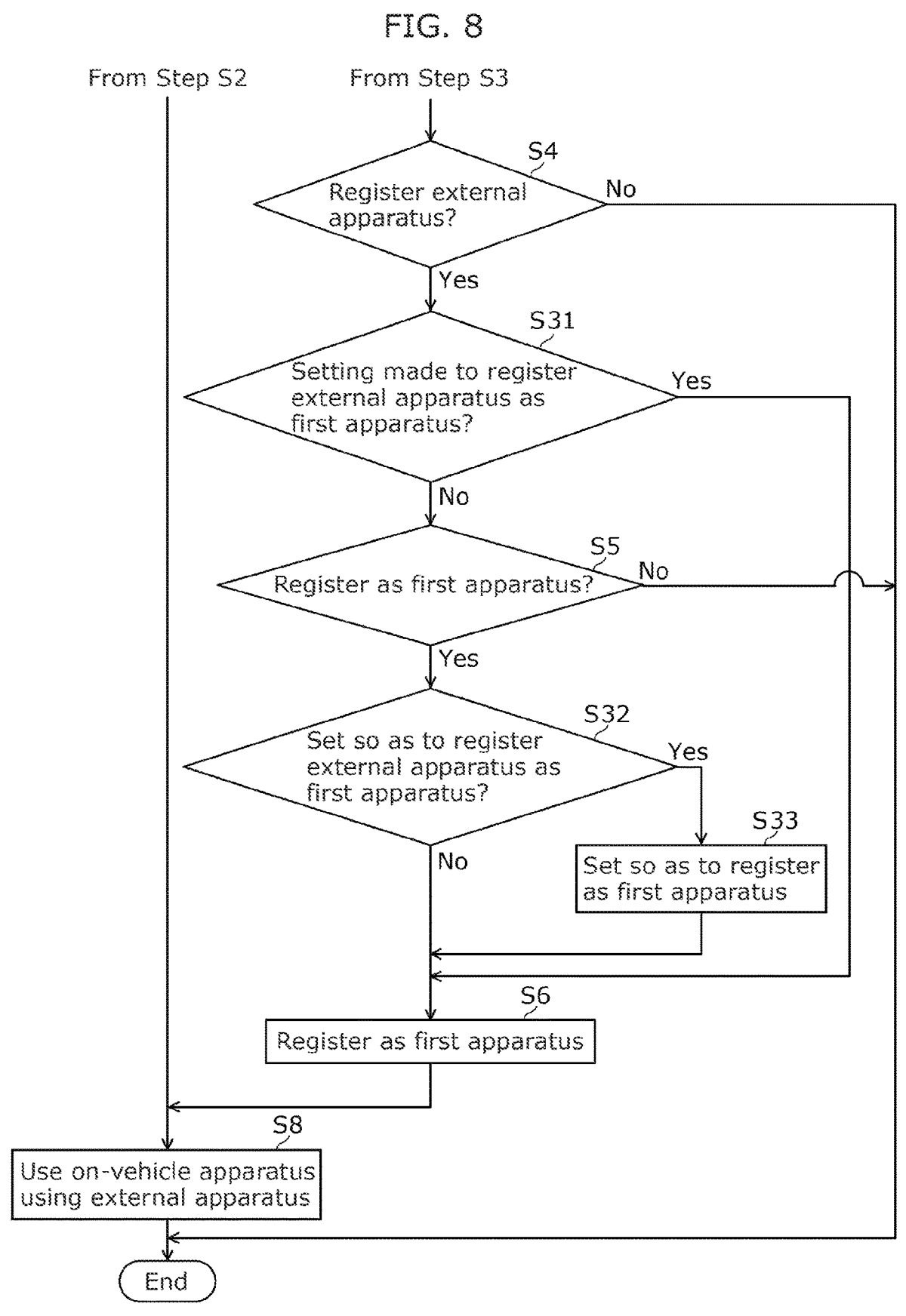

From Step S2     From Step S3

S4
Register external apparatus? — No

Yes

S31
Setting made to register external apparatus as first apparatus? — Yes

No

S5
Register as first apparatus? — No

Yes

S32
Set so as to register external apparatus as first apparatus? — Yes

No

S33
Set so as to register as first apparatus

S6
Register as first apparatus

S8
Use on-vehicle apparatus using external apparatus

End

ON-VEHICLE APPARATUS AND CONTROL METHOD

CROSS REFERENCE TO RELATED APPLICATION

The present application is based on and claims priority of Japanese Patent Application No. 2021-193442 filed on Nov. 29, 2021.

FIELD

The present disclosure relates to an on-vehicle apparatus, a control method, and a program.

BACKGROUND

Conventionally, an on-vehicle apparatus that can be used using an external apparatus, or the like is known. As an example of the on-vehicle apparatus, PTL 1 discloses an on-vehicle electronic apparatus including: an acceptance unit that accepts an execution request of an application from a first apparatus; a determiner that determines whether the first apparatus is set as a communication destination apparatus with which the application communicates; and an execution controller that executes the application for which the execution request has been accepted when the first apparatus is set as the communication destination apparatus.

CITATION LIST

Patent Literature

PTL 1: Japanese Patent No. 6221739

SUMMARY

However, the on-vehicle electronic apparatus according to PTL 1 can be improved upon.

In view of this, the present disclosure provides an on-vehicle apparatus and the like capable of improving upon the above related art.

An on-vehicle apparatus according to one aspect of the present disclosure is an on-vehicle apparatus including: a storage that stores apparatus information related to an external apparatus, the apparatus information being stored for registering the external apparatus as a first apparatus capable of using the on-vehicle apparatus; and a controller that deletes the apparatus information stored in the storage when a use of the on-vehicle apparatus using the external apparatus registered as the first apparatus is determined to have ended.

A control method according to one aspect of the present disclosure is a control method for an on-vehicle apparatus, including: storing apparatus information related to an external apparatus, the apparatus information being stored for registering the external apparatus as a first apparatus capable of using the on-vehicle apparatus; and deleting the apparatus information stored when a use of the on-vehicle apparatus using the external apparatus registered as the first apparatus is determined to have ended.

A program according to one aspect of the present disclosure is a program for causing a computer to execute the control method described above.

It should be noted that these comprehensive or specific aspects may be realized by a system, a method, an integrated circuit, a computer program, or a computer-readable recording medium such as a CD-ROM, or may be realized by any combination of the system, the method, the integrated circuit, the computer program, and the recording medium. In addition, the recording medium may be a non-transitory recording medium.

An on-vehicle apparatus or the like according to one aspect of the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 3 is a flowchart showing a first operation example of the on-vehicle apparatus shown in FIG. 1.

FIG. 4 is a diagram for explaining the first operation example shown in FIG. 3.

FIG. 5 is a diagram for explaining the first operation example shown in FIG. 3.

FIG. 6 is a flowchart showing a second operation example of the on-vehicle apparatus shown in FIG. 1.

FIG. 8 is a flowchart showing a fourth operation example of the on-vehicle apparatus shown in FIG. 1.

DESCRIPTION OF EMBODIMENTS

Figure 1:
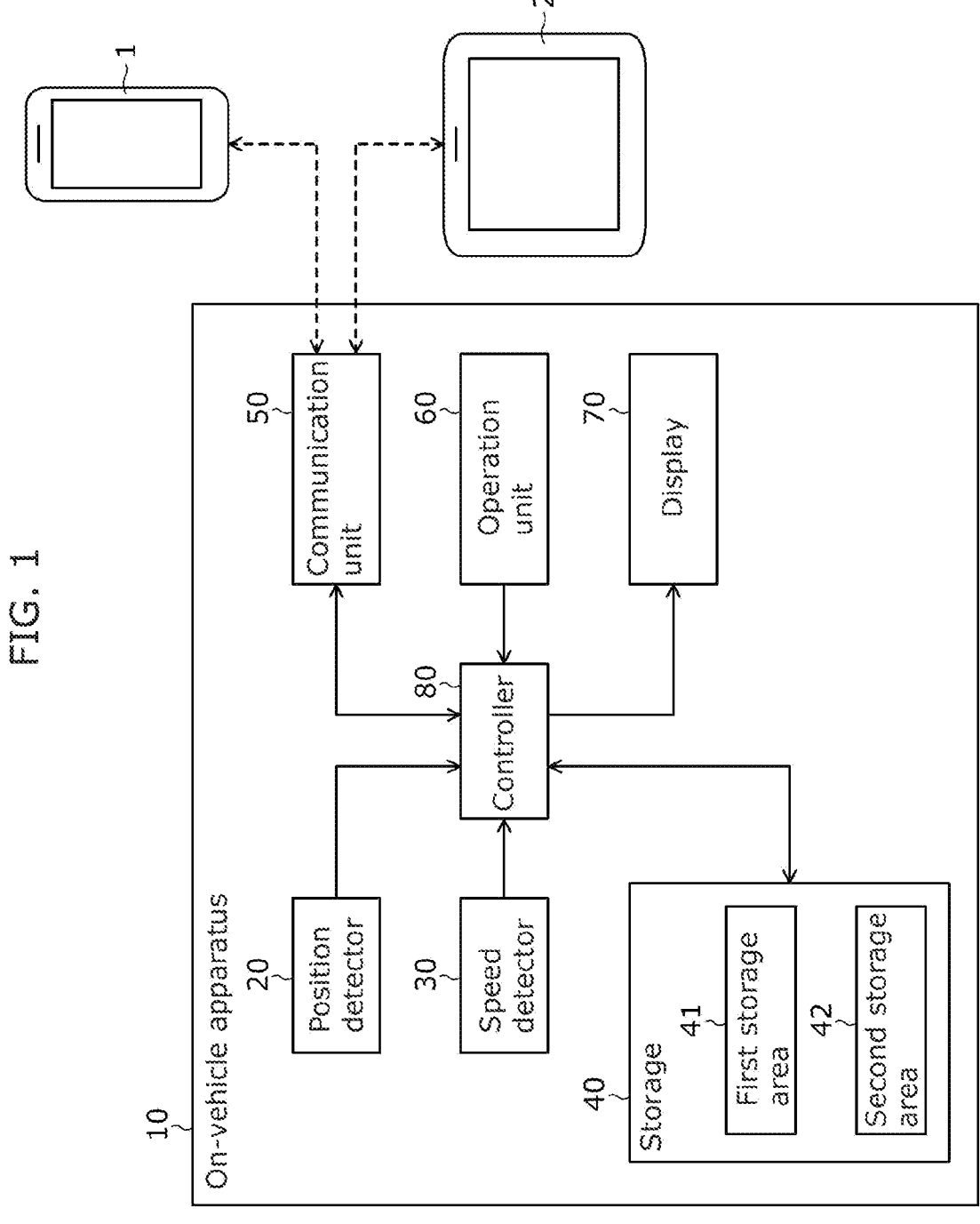
FIG. 1 is a block diagram showing a functional configuration of an on-vehicle apparatus according to an embodiment.

The inventors of the present disclosure have found that the following problem occurs regarding the on-vehicle electronic apparatus described in the "Background".

In the on-vehicle electronic apparatus according to PTL 1, after a use of the on-vehicle electronic apparatus using a first apparatus is ended, information related to the first apparatus remains in the on-vehicle electronic apparatus, and thus there is a fear that the information related to the first apparatus will be seen by other people. As a result, there is a problem that a user will hesitate to use the on-vehicle electronic apparatus using the first apparatus.

In view of this, the present disclosure provides an on-vehicle apparatus that can be used with ease using an external apparatus, and the like.

Hereinafter, embodiments will be described in detail with reference to the drawings.

It should be noted that any of the embodiments described below describes a comprehensive or specific example. Numerical values, shapes, materials, constituent elements, positions at which the constituent elements are disposed, connection forms of the constituent elements, steps, an order of the steps, and the like described in the embodiments below are mere examples and are not intended to limit the present disclosure. Moreover, of the constituent elements in the embodiments below, the constituent elements that are not described in the independent claims are described as arbitrary constituent elements. Further, each diagram is a schematic diagram and is not necessarily illustrated precisely.

Furthermore, in each diagram, the same constituent members are denoted by the same reference numerals.

EMBODIMENT

Figure 2:
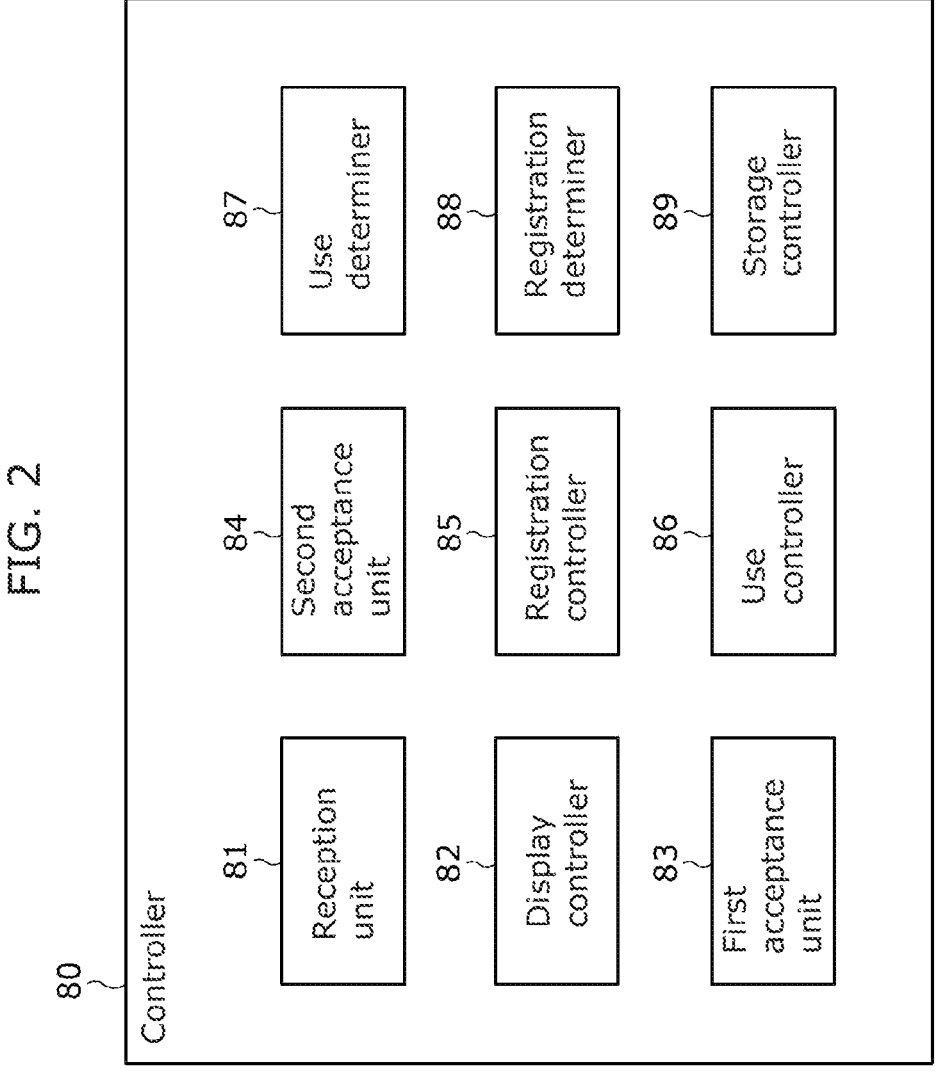
FIG. 2 is a block diagram showing a functional configuration of a controller of the on-vehicle apparatus shown in FIG. 1.

FIG. 1 is a block diagram showing a functional configuration of on-vehicle apparatus 10 according to an embodiment. FIG. 2 is a block diagram showing a functional configuration of controller 80 of on-vehicle apparatus 10 shown in FIG. 1. The functional configuration of on-vehicle apparatus 10 will be described with reference to FIGS. 1 and 2.

As shown in FIG. 1, on-vehicle apparatus 10 is an electronic apparatus mounted on a vehicle. In other words, on-vehicle apparatus 10 is an electronic apparatus for a vehicle. For example, on-vehicle apparatus 10 is a car navigation apparatus, a car audio apparatus, or the like. For example, the vehicle is an automobile or the like. Specifically, for example, the vehicle is a rental car, a car used for car-sharing, or the like. On-vehicle apparatus 10 can be used using each of external apparatus 1 and external apparatus 2. Specifically, for example, an application installed in on-vehicle apparatus 10 can be executed using each of external apparatus 1 and external apparatus 2. For example, the application is an application for reproducing music, an application for performing handsfree communication, or the like. For example, each of external apparatus 1 and external apparatus 2 is a mobile terminal. In this embodiment, external apparatus 1 is a smartphone, and external apparatus 2 is a tablet terminal. For example, each of external apparatus 1 and external apparatus 2 is an apparatus owned by a user who uses the vehicle on which on-vehicle apparatus 10 is mounted. For example, the user who uses the vehicle on which on-vehicle apparatus 10 is mounted is a person who owns the vehicle, a person who is renting the vehicle, or the like. For example, when the vehicle on which on-vehicle apparatus 10 is mounted is a rental car, the user who uses the vehicle is a person who has rented the rental car, a person who drives the rental car, a passenger of the rental car, or the like. It should be noted that, for example, the number of external apparatuses capable of using on-vehicle apparatus 10 may be one, or may be plural. On-vehicle apparatus 10 includes position detector 20, speed detector 30, storage 40, communication unit 50, operation unit 60, display 70, and controller 80.

Position detector 20 detects a position of the vehicle on which on-vehicle apparatus 10 is mounted. Position detector 20 outputs position information indicating the position of the vehicle to controller 80. For example, position detector 20 includes a GPS (Global Positioning System) unit or the like.

Speed detector 30 detects a speed of the vehicle on which on-vehicle apparatus 10 is mounted. Speed detector 30 outputs speed information indicating the speed of the vehicle to controller 80. For example, speed detector 30 includes a speed sensor or the like.

Storage 40 stores various types of information. For example, storage 40 stores information used by controller 80 to control on-vehicle apparatus 10. Further, for example, storage 40 stores information that controller 80 has acquired from each of external apparatus 1 and external apparatus 2. For example, storage 40 is realized by a memory or the like.

For example, storage 40 stores apparatus information related to external apparatus 1, for registering external apparatus 1 as a first apparatus capable of using on-vehicle apparatus 10. Specifically, for example, by storage 40 storing the apparatus information related to external apparatus 1, external apparatus 1 is registered as the first apparatus capable of using on-vehicle apparatus 10, and thus on-vehicle apparatus 10 can be used using external apparatus 1. For example, the apparatus information related to external apparatus 1 is information requisite for registering external apparatus 1 as the first apparatus capable of using on-vehicle apparatus 10, and includes a name of external apparatus 1, account information of external apparatus 1 for using an application installed in on-vehicle apparatus 10, and the like. Although details will be described later, when a use of on-vehicle apparatus 10 using external apparatus 1 registered as the first apparatus is determined to have ended, the registration of external apparatus 1 as the first apparatus is canceled, and the apparatus information related to external apparatus 1, which is stored in storage 40, is deleted. The same holds true for external apparatus 2.

Further, for example, storage 40 stores apparatus information related to external apparatus 1, for registering external apparatus 1 as a second apparatus capable of using on-vehicle apparatus 10. Specifically, for example, by storage 40 storing the apparatus information related to external apparatus 1, external apparatus 1 is registered as the second apparatus capable of using on-vehicle apparatus 10, and thus on-vehicle apparatus 10 can be used using external apparatus 1. For example, the apparatus information related to external apparatus 1 is information requisite for registering external apparatus 1 as the second apparatus capable of using on-vehicle apparatus 10, and includes a name of external apparatus 1, account information of external apparatus 1 for using an application installed in on-vehicle apparatus 10, and the like. Although details will be described later, when a use of on-vehicle apparatus 10 using external apparatus 1 registered as the second apparatus is determined to have ended, the registration of external apparatus 1 as the second apparatus is not canceled, and the apparatus information related to external apparatus 1, which is stored in storage 40, is not deleted. The same holds true for external apparatus 2.

Storage 40 includes first storage area 41 and second storage area 42.

First storage area 41 stores the apparatus information related to external apparatus 1, for registering external apparatus 1 as the first apparatus. In other words, when registering external apparatus 1 as the first apparatus, the apparatus information related to external apparatus 1 is stored in first storage area 41, and thus first storage area 41 stores the apparatus information related to external apparatus 1 registered as the first apparatus. When the use of on-vehicle apparatus 10 using external apparatus 1 registered as the first apparatus is determined to have ended, the registration of external apparatus 1 as the first apparatus is canceled, and the apparatus information related to external apparatus 1, which is stored in first storage area 41, is deleted. The same holds true for external apparatus 2.

Second storage area 42 stores the apparatus information related to external apparatus 1, for registering external apparatus 1 as the second apparatus. In other words, when registering external apparatus 1 as the second apparatus, the apparatus information related to external apparatus 1 is stored in second storage area 42, and thus second storage area 42 stores the apparatus information related to external apparatus 1 registered as the second apparatus. When the use of on-vehicle apparatus 10 using external apparatus 1 registered as the second apparatus is determined to have ended, the registration of external apparatus 1 as the second apparatus is not canceled, and the apparatus information related to external apparatus 1, which is stored in second storage area 42, is not deleted. The same holds true for external apparatus 2.

Communication unit 50 communicates with each of external apparatus 1 and external apparatus 2 by wired or wireless communication. For example, external apparatus 1 transmits the apparatus information related to external apparatus 1 to communication unit 50, and communication unit 50 receives the apparatus information related to external apparatus 1 from external apparatus 1. The same holds true for external apparatus 2. For example, communication unit 50 includes a communication module or the like.

Operation unit 60 accepts operations for using on-vehicle apparatus 10. For example, the user who is using the vehicle on which on-vehicle apparatus 10 is mounted can use operation unit 60 to use on-vehicle apparatus 10. For example, operation unit 60 includes a touch panel and/or hardware buttons, and the like.

Display 70 displays various types of information. For example, display 70 is capable of displaying an image or the like for using on-vehicle apparatus 10 using operation unit 60. For example, display 70 is also capable of displaying the apparatus information related to external apparatus 1, the apparatus information related to external apparatus 2, and the like that are stored in storage 40. For example, display 70 includes a liquid crystal display, an organic EL display, or the like.

Controller 80 controls on-vehicle apparatus 10. For example, controller 80 is realized by a processor or the like. As shown in FIG. 2, controller 80 includes reception unit 81, display controller 82, first acceptance unit 83, second acceptance unit 84, registration controller 85, use controller 86, use determiner 87, registration determiner 88, and storage controller 89.

Reception unit 81 receives a use request of on-vehicle apparatus 10. For example, when the user who is using the vehicle on which on-vehicle apparatus 10 is mounted is to use on-vehicle apparatus 10 using external apparatus 1, the user operates external apparatus 1 to transmit a use request of on-vehicle apparatus 10 from external apparatus 1, and reception unit 81 receives the use request of on-vehicle apparatus 10 from external apparatus 1. For example, the use request of on-vehicle apparatus 10 is a request to execute an application installed in on-vehicle apparatus 10, or the like. The same holds true for external apparatus 2.

Display controller 82 controls display by display 70 and the like. For example, when a use request of on-vehicle apparatus 10 is received from external apparatus 1 by reception unit 81 but external apparatus 1 is not registered neither as the first apparatus nor the second apparatus, display controller 82 causes display 70, external apparatus 1, and the like to display a warning. The same holds true for external apparatus 2.

First acceptance unit 83 accepts a selection on whether to register external apparatus 1 as the first apparatus. For example, first acceptance unit 83 causes display 70, external apparatus 1, and the like to display an image for accepting the selection on whether to register external apparatus 1 as the first apparatus, and accepts the selection by the user who is using the vehicle on which on-vehicle apparatus 10 is mounted. The same holds true for external apparatus 2.

Second acceptance unit 84 accepts a selection on whether to make a setting so as to register external apparatus 1 as the first apparatus when a use request to use on-vehicle apparatus 10 using external apparatus 1 is received. For example, second acceptance unit 84 causes display 70, external apparatus 1, and the like to display an image for accepting the selection on whether to make a setting so as to register external apparatus 1 as the first apparatus when a use request to use on-vehicle apparatus 10 using external apparatus 1 is received, and accepts the selection by the user who is using the vehicle on which on-vehicle apparatus 10 is mounted. The same holds true for external apparatus 2.

Registration controller 85 controls the registration of each of external apparatus 1 and external apparatus 2. For example, when a selection to register external apparatus 1 as the first apparatus is accepted by first acceptance unit 83, registration controller 85 registers external apparatus 1 as the first apparatus. For example, registration controller 85 causes the apparatus information related to external apparatus 1 to be stored in first storage area 41 to register external apparatus 1 as the first apparatus. Further, for example, when a selection not to register external apparatus 1 as the first apparatus is accepted by first acceptance unit 83, registration controller 85 registers external apparatus 1 as the second apparatus. For example, registration controller 85 causes the apparatus information related to external apparatus 1 to be stored in second storage area 42 to register external apparatus 1 as the second apparatus. It should be noted that, for example, when the selection not to register external apparatus 1 as the first apparatus is accepted by first acceptance unit 83, registration controller 85 does not need to register external apparatus 1 as neither the first apparatus nor the second apparatus. The same holds true for external apparatus 2.

Furthermore, for example, when a selection to make a setting so as to register external apparatus 1 as the first apparatus is accepted by second acceptance unit 84, registration controller 85 registers external apparatus 1 as the first apparatus without accepting a selection on whether to register external apparatus 1 as the first apparatus. For example, when the selection to make a setting so as to register external apparatus 1 as the first apparatus is accepted, registration controller 85 determines whether external apparatus 1 is registered as the first apparatus every time a use request of on-vehicle apparatus 10 is received from external apparatus 1, and when external apparatus 1 is not registered as the first apparatus, registration controller 85 registers external apparatus 1 as the first apparatus without accepting the selection on whether to register external apparatus 1 as the first apparatus. The same holds true for external apparatus 2.

Furthermore, for example, when the use of on-vehicle apparatus 10 using external apparatus 1 registered as the first apparatus is ended, registration controller 85 cancels the registration of external apparatus 1 as the first apparatus. Moreover, for example, when the use of on-vehicle apparatus 10 using external apparatus 1 registered as the second apparatus is ended, registration controller 85 does not cancel the registration of external apparatus 1 as the second apparatus. The same holds true for external apparatus 2.

Use controller 86 controls the use of on-vehicle apparatus 10, that uses external apparatus 1 registered as the first apparatus. Use controller 86 also controls the use of on-vehicle apparatus 10, that uses external apparatus 1 registered as the second apparatus. For example, use controller 86 causes on-vehicle apparatus 10 to operate based on an operation of on-vehicle apparatus 10 made using external apparatus 1. The same holds true for external apparatus 2.

Use determiner 87 determines whether the use of on-vehicle apparatus 10 using external apparatus 1 has ended. For example, use determiner 87 determines that the use of on-vehicle apparatus 10 using external apparatus 1 has ended when communication between on-vehicle apparatus 10 and external apparatus 1 is cut off. For example, use determiner 87 determines that the use of on-vehicle apparatus 10 using external apparatus 1 has ended when communication between on-vehicle apparatus 10 and external apparatus 1 is cut off for a predetermined period. Alternatively, for example, use determiner 87 determines that the use of on-vehicle apparatus 10 using external apparatus 1 has ended when a power supply of on-vehicle apparatus 10 is turned off. For example, use determiner 87 determines that the use of on-vehicle apparatus 10 using external apparatus 1 has ended when an accessory power supply of the vehicle on which on-vehicle apparatus 10 is mounted is turned off. The same holds true for external apparatus 2.

Registration determiner 88 determines whether external apparatus 1 is registered as the first apparatus or the second apparatus. For example, when apparatus information related to external apparatus 1 is stored in first storage area 41, registration determiner 88 determines that external apparatus 1 is registered as the first apparatus. Alternatively, for example, when apparatus information related to external apparatus 1 is stored in second storage area 42, registration determiner 88 determines that external apparatus 1 is registered as the second apparatus. Alternatively, for example, when apparatus information related to external apparatus 1 is not stored in neither first storage area 41 nor second storage area 42, registration determiner 88 determines that external apparatus 1 is not registered as neither the first apparatus nor the second apparatus. The same holds true for external apparatus 2.

Storage controller 89 controls storage of apparatus information related to external apparatus 1, and the like. For example, when the use of on-vehicle apparatus 10 using external apparatus 1 registered as the first apparatus is determined to have ended, storage controller 89 deletes the apparatus information stored in storage 40. Alternatively, for example, when the use of on-vehicle apparatus 10 using external apparatus 1 registered as the second apparatus is determined to have ended, storage controller 89 does not delete the apparatus information stored in storage 40. The same holds true for external apparatus 2.

The functional configuration of on-vehicle apparatus 10 has been described above.

FIG. 3 is a flowchart showing a first operation example of on-vehicle apparatus 10 shown in FIG. 1. FIGS. 4 and 5 are each a diagram for explaining the first operation example shown in FIG. 3. With reference to FIGS. 3 to 5, the first operation example of on-vehicle apparatus 10 will be described. It should be noted that hereinafter, the first operation example of on-vehicle apparatus 10 with respect to external apparatus 1 will be described.

As shown in FIG. 3, first, controller 80 receives a use request of on-vehicle apparatus 10 from external apparatus 1 (Step S1). For example, when the user wishes to use on-vehicle apparatus 10 using external apparatus 1, the user operates external apparatus 1 to transmit a use request of on-vehicle apparatus 10 from external apparatus 1 to on-vehicle apparatus 10. For example, when the use request of on-vehicle apparatus 10 is transmitted from external apparatus 1 to on-vehicle apparatus 10, controller 80 receives the use request.

Upon receiving the use request of on-vehicle apparatus 10, controller 80 determines whether external apparatus 1 is registered as an apparatus capable of using on-vehicle apparatus 10 (Step S2). Specifically, controller 80 determines whether external apparatus 1 is registered as the first apparatus and whether external apparatus 1 is registered as the second apparatus. For example, when external apparatus 1 is registered as the first apparatus or the second apparatus, the apparatus information related to external apparatus 1 is stored in storage 40. For example, controller 80 determines that external apparatus 1 is registered when the apparatus information is stored in storage 40, and determines that external apparatus 1 is not registered when the apparatus information is not stored in storage 40.

When external apparatus 1 is not registered as an apparatus capable of using on-vehicle apparatus 10 (No in Step S2), controller 80 outputs a warning (Step S3). Specifically, controller 80 outputs a warning that notifies that external apparatus 1 is not registered as an apparatus capable of using on-vehicle apparatus 10. For example, controller 80 outputs the warning to display 70, external apparatus 1, and the like to cause display 70, external apparatus 1, and the like to display the warning.

Upon outputting the warning, controller 80 determines whether to register external apparatus 1 as an apparatus capable of using on-vehicle apparatus 10 (Step S4). For example, as shown in FIG. 4, controller 80 causes external apparatus 1 to display an image for accepting a user selection on whether to register external apparatus 1 as an apparatus capable of using on-vehicle apparatus 10. For example, when "Register" is selected by the user, controller 80 determines that the user has selected to register external apparatus 1 as an apparatus capable of using on-vehicle apparatus 10, and determines to register external apparatus 1. Alternatively, for example, when "Don't register" is selected by the user, controller 80 determines that the user has selected not to register external apparatus 1 as an apparatus capable of using on-vehicle apparatus 10, and determines not to register external apparatus 1.

Returning to FIG. 3, when registering external apparatus 1 as an apparatus capable of using on-vehicle apparatus 10 (Yes in Step S4), controller 80 determines whether to register external apparatus 1 as the first apparatus (Step S5). For example, the first apparatus is an apparatus for which the registration as an apparatus capable of using on-vehicle apparatus 10 is canceled when the use of on-vehicle apparatus 10 using external apparatus 1 is determined to have ended. In other words, for example, when the use of on-vehicle apparatus 10 using external apparatus 1 is determined to have ended in a case where external apparatus 1 is registered as the first apparatus, the registration of external apparatus 1 as an apparatus capable of using on-vehicle apparatus 10 is canceled. For example, as shown in FIG. 5, controller 80 causes external apparatus 1 to display an image for accepting a user selection on whether to register external apparatus 1 as the first apparatus. For example, when "Register as guest" is selected by the user, controller 80 determines that the user has selected to register external apparatus 1 as the first apparatus, and determines to register external apparatus 1 as the first apparatus. Alternatively, for example, when "Register as apparatus to be used at all times" is selected by the user, controller 80 determines that the user has selected not to register external apparatus 1 as the first apparatus, and determines not to register external apparatus 1 as the first apparatus.

Returning to FIG. 3, when registering external apparatus 1 as the first apparatus (Yes in Step S5), controller 80 registers external apparatus 1 as the first apparatus (Step S6). For example, controller 80 registers external apparatus 1 as the first apparatus by causing the apparatus information related to external apparatus 1 to be stored in first storage area 41.

When not registering external apparatus 1 as the first apparatus (No in Step S5), controller 80 registers external apparatus 1 as the second apparatus (Step S7). For example, the second apparatus is an apparatus for which the registration as an apparatus capable of using on-vehicle apparatus 10 is not canceled when the use of on-vehicle apparatus 10 using the second apparatus is determined to have ended. In other words, for example, when the use of on-vehicle apparatus 10 using external apparatus 1 is determined to have ended in a case where external apparatus 1 is registered as the second apparatus, the registration of external apparatus 1 as an apparatus capable of using on-vehicle apparatus 10 is not canceled. For example, controller 80 registers external apparatus 1 as the second apparatus by causing the apparatus information related to external apparatus 1 to be stored in second storage area 42.

When external apparatus 1 is registered as an apparatus capable of using on-vehicle apparatus 10 (Yes in Step S2), when external apparatus 1 is registered as the first apparatus (Step S6), and when external apparatus 1 is registered as the second apparatus (Step S7), controller 80 enables on-vehicle apparatus 10 to be used using external apparatus 1 (Step S8).

The first operation example of on-vehicle apparatus 10 has been described above.

FIG. 6 is a flowchart showing a second operation example of on-vehicle apparatus 10 shown in FIG. 1. With reference to FIG. 6, the second operation example of on-vehicle apparatus 10 will be described.

As shown in FIG. 6, first, controller 80 determines whether communication with external apparatus 1 has been cut off (Step S11). For example, when wireless communication is performed between on-vehicle apparatus 10 and external apparatus 1 but the wireless communication between on-vehicle apparatus 10 and external apparatus 1 is cut off, controller 80 determines that the communication between on-vehicle apparatus 10 and external apparatus 1 has been cut off.

When the communication with external apparatus 1 is not cut off (No in Step S11), controller 80 again determines whether the communication with external apparatus 1 has been cut off (Step S11).

When the communication with external apparatus 1 is cut off (Yes in Step S11), controller 80 determines whether external apparatus 1 is registered as the first apparatus (Step S12). For example, controller 80 determines that external apparatus 1 is registered as the first apparatus when the apparatus information related to external apparatus 1 is stored in first storage area 41. Alternatively, for example, controller 80 determines that external apparatus 1 is not registered as the first apparatus when the apparatus information related to external apparatus 1 is not stored in first storage area 41.

When external apparatus 1 is registered as the first apparatus (Yes in Step S12), controller 80 deletes the apparatus information (Step S13). For example, controller 80 deletes the apparatus information related to external apparatus 1, which is stored in first storage area 41, to delete the apparatus information from on-vehicle apparatus 10.

When external apparatus 1 is not registered as the first apparatus (No in Step S12), controller 80 does not delete the apparatus information. In other words, for example, when external apparatus 1 is not registered as the first apparatus, the apparatus information stored in on-vehicle apparatus 10 is not deleted from on-vehicle apparatus 10.

The second operation example of on-vehicle apparatus 10 has been described above.

Figure 7:
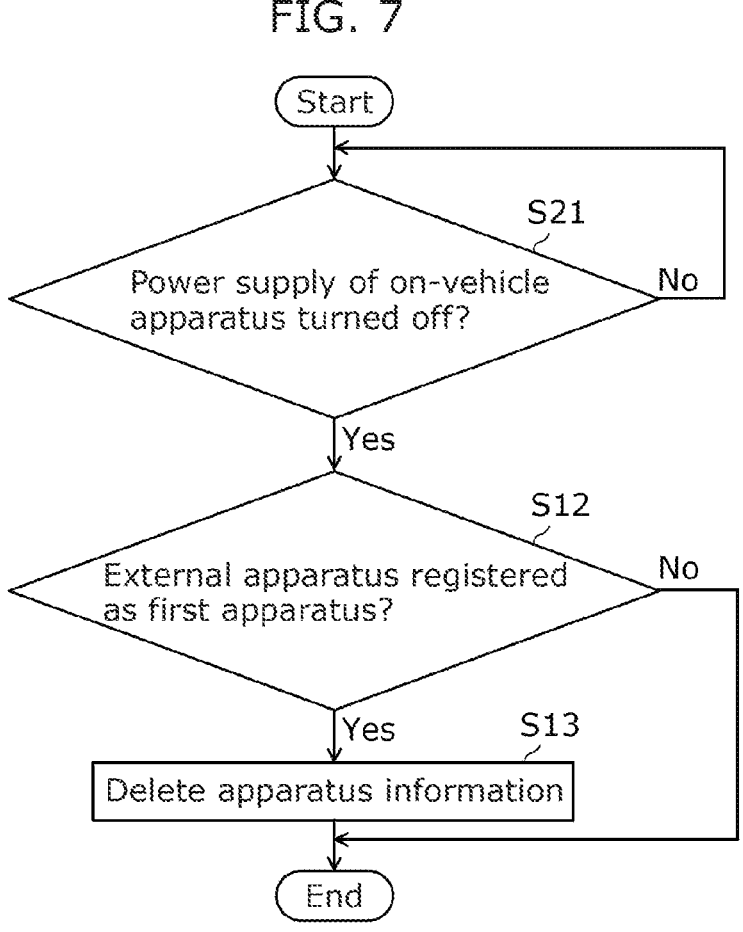
FIG. 7 is a flowchart showing a third operation example of the on-vehicle apparatus shown in FIG. 1.

FIG. 7 is a flowchart showing a third operation example of on-vehicle apparatus 10 shown in FIG. 1. With reference to FIG. 7, the third operation example of on-vehicle apparatus 10 will be described. It should be noted that hereinafter, points different from those of the second operation example shown in FIG. 6 will mainly be described.

As shown in FIG. 7, first, controller 80 determines whether the power supply of on-vehicle apparatus 10 has been turned off (Step S21). For example, controller 80 determines that the power supply of on-vehicle apparatus 10 has been turned off when an accessory power supply of the vehicle on which on-vehicle apparatus 10 is mounted is turned off.

When the power supply of on-vehicle apparatus 10 is not turned off (No in Step S21), controller 80 again determines whether the power supply of on-vehicle apparatus 10 has been turned off (Step S21).

When the power supply of on-vehicle apparatus 10 is turned off (Yes in Step S21), controller 80 determines whether external apparatus 1 is registered as the first apparatus (Step S12).

The third operation example of on-vehicle apparatus 10 has been described above.

Figure 9:
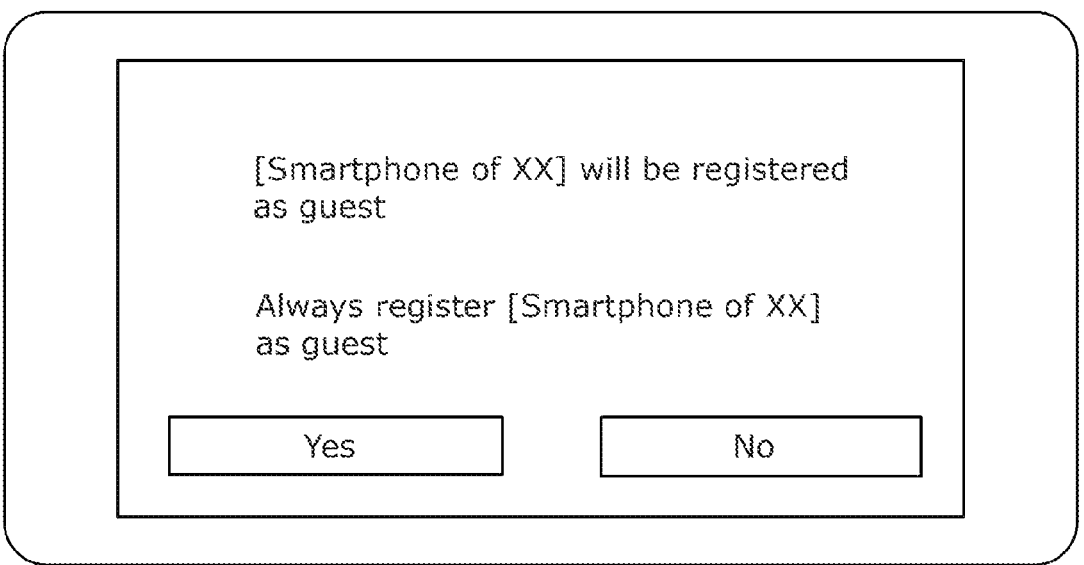
FIG. 9 is a diagram for explaining the fourth operation example shown in FIG. 8.

FIG. 8 is a flowchart showing a fourth operation example of on-vehicle apparatus 10 shown in FIG. 1. FIG. 9 is a diagram for explaining the fourth operation example shown in FIG. 8. The fourth operation example of on-vehicle apparatus 10 will be described with reference to FIGS. 8 and 9. It should be noted that hereinafter, points different from those of the first operation example shown in FIG. 3 will mainly be described.

As shown in FIG. 8, when registering external apparatus 1 (Yes in Step S4), controller 80 determines whether a setting is made to register external apparatus 1 as the first apparatus (Step S31). For example, by storing a MAC (Media Access Control) address of external apparatus 1 in association with a flag indicating to register external apparatus 1 as the first apparatus, the setting is made so as to register external apparatus 1 as the first apparatus. For example, storage 40 includes a third storage area (not shown) different from first storage area 41 and second storage area 42, and the MAC address of external apparatus 1 and the flag are stored in the third storage area. For example, when the MAC address of external apparatus 1 and the flag are stored in association with each other, controller 80 determines that the setting is made to register external apparatus 1 as the first apparatus. Alternatively, for example, when the MAC address of external apparatus 1 and the flag are not stored in association with each other, controller 80 determines that the setting is not made to register external apparatus 1 as the first apparatus.

When the setting is not made to register external apparatus 1 as the first apparatus (No in Step S31), controller 80 determines whether to register external apparatus 1 as the first apparatus (Step S5).

When registering external apparatus 1 as the first apparatus (Yes in Step S5), controller 80 determines whether to make a setting so as to register external apparatus 1 as the first apparatus (Step S32). For example, as shown in FIG. 9, controller 80 causes external apparatus 1 to display an image for accepting a user selection on whether to make a setting so as to register external apparatus 1 as the first apparatus. For example, when "Yes" is selected by the user, controller 80 determines that the user has selected to make a setting to register external apparatus 1 as the first apparatus, and determines to make a setting to register external apparatus 1 as the first apparatus. Alternatively, for example, when "No" is selected by the user, controller 80 determines that the user has selected not to make a setting to register external apparatus 1 as the first apparatus, and determines not to make a setting to register external apparatus 1 as the first apparatus.

Returning to FIG. 8, when making a setting to register external apparatus 1 as the first apparatus (Yes in Step S32), controller 80 makes the setting to register external apparatus 1 as the first apparatus (Step S33), and registers external apparatus 1 as the first apparatus (Step S6). For example, by storing the MAC address of external apparatus 1 in association with a flag indicating that external apparatus 1 is to be registered as the first apparatus, controller 80 makes the setting to register external apparatus 1 as the first apparatus.

When the setting to register external apparatus 1 as the first apparatus is not to be made (No in Step S32), controller 80 registers external apparatus 1 as the first apparatus without making the setting to register external apparatus 1 as the first apparatus (Step S6).

When not registering external apparatus 1 as the first apparatus (No in Step S5), controller 80 also does not register external apparatus 1 as the second apparatus. In this manner, herein, when not registering external apparatus 1 as the first apparatus, controller 80 prohibits the use of on-vehicle apparatus 10 using external apparatus 1. In other words, herein, only when external apparatus 1 is registered as the first apparatus, controller 80 enables on-vehicle apparatus 10 to be used using external apparatus 1.

In a case where, after the setting is made to register external apparatus 1 as the first apparatus, a use request of on-vehicle apparatus 10 is received again from external apparatus 1 but external apparatus 1 is not yet registered as the first apparatus, controller 80 registers external apparatus 1 as the first apparatus without accepting a selection on whether to register external apparatus 1 as the first apparatus.

The fourth operation example of on-vehicle apparatus 10 has been described above.

In on-vehicle apparatus 10, when the use of on-vehicle apparatus 10 using external apparatus 1 registered as the first apparatus is determined to have ended, the apparatus information related to external apparatus 1 is deleted from on-vehicle apparatus 10 without the user performing an operation to delete the apparatus information related to external apparatus 1 from on-vehicle apparatus 10. Therefore, since a situation where the apparatus information related to external apparatus 1 is seen by other people can be suppressed, security can be improved, and on-vehicle apparatus 10 can be used safely using external apparatus 1, on-vehicle apparatus 10 can be used with ease using external apparatus 1.

On-vehicle apparatus 10 has been described above.

On-vehicle apparatus 10 according to the embodiment is an on-vehicle apparatus including: storage 40 that stores apparatus information related to external apparatus 1, the apparatus information being stored for registering external apparatus 1 as a first apparatus capable of using on-vehicle apparatus 10; and controller 80 that deletes the apparatus information stored in storage 40 when a use of on-vehicle apparatus 10 using external apparatus 1 registered as the first apparatus is determined to have ended.

Accordingly, when the use of on-vehicle apparatus 10 using external apparatus 1 registered as the first apparatus is determined to have ended, the apparatus information stored in storage 40 is deleted. Therefore, since a situation where the apparatus information related to external apparatus 1 is seen by other people can be suppressed, on-vehicle apparatus 10 can be used safely using external apparatus 1, and on-vehicle apparatus 10 can be used with ease using external apparatus 1.

Further, in on-vehicle apparatus 10 according to the embodiment, storage 40 stores the apparatus information for registering external apparatus 1 as a second apparatus capable of using on-vehicle apparatus 10, and controller 80 does not delete the apparatus information stored in storage 40 when a use of on-vehicle apparatus 10 using external apparatus 1 registered as the second apparatus is determined to have ended.

Accordingly, when the use of on-vehicle apparatus 10 using external apparatus 1 registered as the second apparatus is determined to have ended, the apparatus information stored in storage 40 is not deleted. Therefore, when the use of on-vehicle apparatus 10 using external apparatus 1 is determined to have ended and there is no need to delete the apparatus information related to external apparatus 1, it is possible not to delete the apparatus information related to external apparatus 1. As a result, on-vehicle apparatus 10 can be used more easily using external apparatus 1.

Furthermore, in on-vehicle apparatus 10 according to the embodiment, storage 40 includes first storage area 41 that stores the apparatus information for registering external apparatus 1 as the first apparatus, and second storage area 42 that stores the apparatus information for registering external apparatus 1 as the second apparatus.

Accordingly, since the apparatus information for registering external apparatus 1 as the first apparatus can be stored in the area different from that of the second apparatus, external apparatus 1 can be registered as the first apparatus irrespective of the number of second apparatuses. As a result, on-vehicle apparatus 10 can be used more easily using external apparatus 1.

Moreover, in on-vehicle apparatus 10 according to the embodiment, controller 80 accepts a selection on whether to register external apparatus 1 as the first apparatus, and when a selection to register external apparatus 1 as the first apparatus is accepted, registers external apparatus 1 as the first apparatus.

Accordingly, since whether to register external apparatus 1 as the first apparatus can be selected, on-vehicle apparatus 10 can be used more easily using external apparatus 1.

Further, in on-vehicle apparatus 10 according to the embodiment, controller 80 accepts a selection on whether to make a setting so as to register external apparatus 1 as the first apparatus, and when a selection to make a setting so as to register external apparatus 1 as the first apparatus is accepted, registers external apparatus 1 as the first apparatus without accepting a selection on whether to register external apparatus 1 as the first apparatus.

Accordingly, since external apparatus 1 can be registered as the first apparatus without having to accept the selection on whether to register external apparatus 1 as the first apparatus a number of times, on-vehicle apparatus 10 can be used more easily using external apparatus 1.

Furthermore, in on-vehicle apparatus 10 according to the embodiment, controller 80 determines that the use of on-vehicle apparatus 10 using external apparatus 1 has ended when communication between on-vehicle apparatus 10 and external apparatus 1 is cut off.

Since the apparatus information stored in storage 40 can be deleted when communication between on-vehicle apparatus 10 and external apparatus 1 is cut off, on-vehicle apparatus 10 can be used more easily using external apparatus 1.

Further, in on-vehicle apparatus 10 according to the embodiment, controller 80 determines that the use of on-vehicle apparatus 10 using external apparatus 1 has ended when a power supply of on-vehicle apparatus 10 is turned off.

Accordingly, since the apparatus information stored in storage 40 can be deleted when the power supply of on-vehicle apparatus 10 is turned off, on-vehicle apparatus 10 can be used more easily using external apparatus 1.

A control method for on-vehicle apparatus 10 according to the embodiment is a control method for on-vehicle apparatus 10, including: storing apparatus information related to external apparatus 1, the apparatus information being stored for registering external apparatus 1 as a first apparatus capable of using on-vehicle apparatus 10; and deleting the stored apparatus information when a use of on-vehicle apparatus 10 using external apparatus 1 registered as the first apparatus is determined to have ended (Step S13).

Accordingly, an operational effect similar to that of on-vehicle apparatus 10 described above is obtained.

A program according to the embodiment is a program for causing a computer to execute the control method described above.

Accordingly, an operational effect similar to that of on-vehicle apparatus 10 described above is obtained.

Other Embodiments Etc

Heretofore, the on-vehicle apparatus, control method, and program according to one or a plurality of aspects have been described based on the embodiment. However, the present disclosure is not limited to this embodiment. This embodiment may be variously modified by those skilled in the art without departing from the spirit and scope of the present disclosure.

In the embodiment described above, the case where controller 80 registers external apparatus 1 as the second apparatus has been described, though the present disclosure is not limited thereto. For example, controller 80 does not need to register external apparatus 1 as the second apparatus. For example, in this case, when it is determined to register external apparatus 1 (Yes in Step S4), controller 80 may register external apparatus 1 as the first apparatus without accepting a user selection. Moreover, in this case, for example, when it is determined that communication between on-vehicle apparatus 10 and external apparatus 1 is cut off (Yes in Step S11) and when the power supply of on-vehicle apparatus 10 is turned off (Yes in Step S21), controller 80 may delete the apparatus information without determining whether external apparatus 1 is registered as the first apparatus (Step S13).

In the embodiment described above, the descriptions have been given on the case where controller 80 determines that the use of on-vehicle apparatus 10 using external apparatus 1 has ended when communication between on-vehicle apparatus 10 and external apparatus 1 is cut off and the case where controller 80 determines that the use of on-vehicle apparatus 10 using external apparatus 1 has ended when the power supply of on-vehicle apparatus 10 is turned off, though the present disclosure is not limited thereto. For example, controller 80 may determine that the use of on-vehicle apparatus 10 using external apparatus 1 has ended when information indicating that a use of the vehicle on which on-vehicle apparatus 10 is mounted has ended is received from an external system or the like. For example, when the vehicle is a rental car, the external system is a rental car management system. Moreover, for example, controller 80 may determine that the use of on-vehicle apparatus 10 using external apparatus 1 has ended when the vehicle on which on-vehicle apparatus 10 is mounted stops at a predetermined position, based on a detection result of position detector 20. Further, for example, controller 80 may determine that the use of on-vehicle apparatus 10 using external apparatus 1 has ended when a speed of the vehicle on which on-vehicle apparatus 10 is mounted is 0 km/s for a predetermined period, based on a detection result of speed detector 30.

In the embodiment described above, the case where storage 40 includes first storage area 41 and second storage area 42 has been described, though the present disclosure is not limited thereto.

For example, storage 40 may store, in a single storage area, apparatus information for registering external apparatus 1 as the first apparatus and apparatus information for registering external apparatus 1 as the second apparatus. In this case, for example, storage 40 may store the apparatus information in association with a flag or the like for distinguishing which of the apparatus information for registering external apparatus 1 as the first apparatus and the apparatus information for registering external apparatus 1 as the second apparatus the apparatus information is.

It should be noted that in the embodiment described above, the respective constituent elements may be constituted by dedicated hardware or may be realized by executing software programs suited for the respective constituent elements. The respective constituent elements may be realized by a program execution portion such as a CPU (Central Processing Unit) and a processor reading and executing software programs recorded onto a recording medium such as a hard disk and a semiconductor memory. Herein, software that realizes the devices and the like according to the embodiment described above is a program for causing a computer to execute the respective steps included in the flowcharts shown in FIG. 3 and FIGS. 6 to 8.

It should be noted that the following cases are also included in the present disclosure.

(1) Specifically, each device described above is a computer system constituted of a microprocessor, a ROM, a RAM, a hard disk unit, a display unit, a keyboard, a mouse, and the like. The RAM or hard disk unit stores therein a computer program. By the microprocessor operating according to the computer program, each device achieves its function. Herein, the computer program is configured by combining a plurality of command codes that indicate instructions to a computer for achieving a predetermined function.

(2) A part or all of the constituent elements constituting each of the devices described above may be configured by a single system LSI (Large Scale Integration). The system LSI is a super multifunction LSI manufactured by integrating a plurality of constituent portions on a single chip, specifically, a computer system configured by including a microprocessor, a ROM, a RAM, and the like. A computer program is stored in the RAM. By the microprocessor operating according to the computer program, the system LSI achieves its function.

(3) A part or all of the constituent elements constituting each of the devices described above may be configured by an IC card or a single module attachable/detachable to/from each device. The IC card or the module is a computer system constituted of a microprocessor, a ROM, a RAM, and the like. The IC card or the module may include the super multifunction LSI described above. By the microprocessor operating according to a computer program, the IC card or the module achieves its function. This IC card or module may have tamper-resistance.

(4) The present disclosure may be the methods described above, a computer program that realizes these methods by a computer, or digital signals constituted of the computer program.

Moreover, the present disclosure may be a computer-readable recording medium onto which the computer program or the digital signals are recorded, examples of the computer-readable recording medium including a flexible disk, a hard disk, a CD-ROM, an MO, a DVD, a DVD-ROM, a DVD-RAM, a BD (Blu-ray (registered trademark) Disc), a semiconductor memory, and the like. Alternatively, the present disclosure may be the digital signals recorded onto these recording media.

Further, the present disclosure may transmit the computer program or the digital signals using an electric communication line, a wireless or wired communication line, a network represented by the Internet, data broadcasting, or the like.

Furthermore, the present disclosure may be a computer system including a microprocessor and a memory, in which the memory stores the computer program, and the microprocessor operates according to the computer program.

Moreover, the present disclosure may be executed by another independent computer system by recording the program or the digital signals onto the recording medium and transferring the program or the digital signals, or by transferring the program or the digital signals via the network or the like.

(5) The embodiment described above and other embodiments may be combined.

While various embodiments have been described herein above, it is to be appreciated that various changes in form and detail may be made without departing from the spirit and scope of the present disclosure as presently or hereafter claimed.

Further Information About Technical Background to This Application

The disclosure of the following patent application including specification, drawings, and claims are incorporated herein by reference in their entirety: Japanese Patent Application No. 2021-193442 filed on Nov. 29, 2021.

INDUSTRIAL APPLICABILITY

The present disclosure is applicable to an on-vehicle apparatus that can be used using an external apparatus, and the like.

The invention claimed is:

1. An on-vehicle apparatus, comprising:
   a storage that stores apparatus information related to an external apparatus, the apparatus information being stored for registering the external apparatus as being capable of using the on-vehicle apparatus; and
   a controller configured to delete the apparatus information stored in the storage when a use of the on-vehicle apparatus using the external apparatus is determined to have ended,
   wherein the controller:
      accepts a selection as to whether or not to set the external apparatus to be registered as a first apparatus, and when the selection to set the external apparatus to be registered as the first apparatus is accepted, stores in the storage the apparatus information that uniquely identifies the external apparatus in association with a flag indicating registration as the first apparatus; and
      when determining that the use of the on-vehicle apparatus using the external apparatus registered as the first apparatus has ended, does not delete the apparatus information that uniquely identifies the external apparatus stored in association with the flag in the storage.

2. The on-vehicle apparatus according to claim 1, wherein the storage stores the apparatus information for registering the external apparatus as a second apparatus capable of using the on-vehicle apparatus, and
   the controller does not delete the apparatus information stored in the storage when a use of the on-vehicle apparatus using the external apparatus registered as the second apparatus is determined to have ended.

3. The on-vehicle apparatus according to claim 2, wherein the storage includes:
   a first storage area that stores the apparatus information for registering the external apparatus;
   a second storage area that stores the apparatus information for registering the external apparatus as the second apparatus; and
   a third storage area that stores the apparatus information that uniquely identifies the external apparatus in association with the flag.

4. The on-vehicle apparatus according to claim 1, wherein the controller accepts the selection on whether to register the external apparatus as the first apparatus, and when the selection to register the external apparatus as the first apparatus is accepted, registers the external apparatus as the first apparatus.

5. The on-vehicle apparatus according to claim 1, wherein when the apparatus information that uniquely identifies the external apparatus and the flag are stored in association in the storage, the controller registers the external apparatus as the first apparatus without requiring the selection on whether to set the external apparatus to be registered as the first apparatus.

6. The on-vehicle apparatus according to claim 1, wherein the controller determines that the use of the on-vehicle apparatus using the external apparatus has ended when communication between the on-vehicle apparatus and the external apparatus is cut off.

7. The on-vehicle apparatus according to claim 1, wherein the controller determines that the use of the on-vehicle apparatus using the external apparatus has ended when a power supply of the on-vehicle apparatus is turned off.

8. A control method for an on-vehicle apparatus, the control method comprising:
   storing, in a storage, apparatus information related to an external apparatus, the apparatus information being stored for registering the external apparatus as being capable of using the on-vehicle apparatus;
   deleting, by a controller, the apparatus information stored in the storage when a use of the on-vehicle apparatus using the external apparatus is determined to have ended;
   accepting, by the controller, a selection as to whether or not to set the external apparatus to be registered as a first apparatus, and when the selection to set the external apparatus to be registered as the first apparatus is accepted, storing, in the storage, the apparatus information that uniquely identifies the external apparatus in association with a flag indicating registration as the first apparatus; and when determining, by the controller, that the use of the on-vehicle apparatus using the external apparatus registered as the first apparatus has ended, maintaining the apparatus information that uniquely identifies the external apparatus in association with the flag in the storage.

* * * * *